United States Patent [19]

Dunbar

[11] 3,744,887
[45] July 10, 1973

[54] PLASTIC HINGE FOR SPECTACLES
[75] Inventor: George Dunbar, Sinking Spring, Pa.
[73] Assignee: ESB Incorporated, Philadelphia, Pa.
[22] Filed: June 22, 1972
[21] Appl. No.: 265,158

[52] U.S. Cl.......... 351/153, 16/128 A, 16/DIG. 13, 351/121, 351/140
[51] Int. Cl........................... G02c 5/22, G02c 5/16
[58] Field of Search.................... 351/121, 140, 153; 16/128 A, DIG. 13

[56] References Cited
FOREIGN PATENTS OR APPLICATIONS
914,793   10/1946   France................................ 351/153
954,467   6/1949    France................................ 351/153

Primary Examiner—Ronald L. Wibert
Assistant Examiner—Paul A. Sacher
Attorney—Robert H. Robinson et al.

[57] ABSTRACT

A hinge for use with molded plastic parts and, in particular, for spectacles comprises two parallel bosses with sockets therein forming a part of the spectacle frame. A temple body has two pin arms formed thereon each pin arm including a projecting pin. A slot separates the two pin arms and permits assembly of the hinge. A pin arm locking bar is formed as a part of the temple body and is attached thereto by a web thin enough to be flexible. Cooperating locking means are formed on the locking bar and the pin arms. When the projecting pins are located in the sockets in the bosses and pin arm locking bar is forced between the pin arms, a simple permanent hinge is formed.

8 Claims, 6 Drawing Figures

PATENTED JUL 10 1973 3,744,887

PLASTIC HINGE FOR SPECTACLES

BACKGROUND OF THE INVENTION

1. Field of the Invention

This invention relates to hinges made of plastic material. In particular, it relates to hinges used in spectacle frames.

2. Description of the Prior Art

For some years, spectacle frame makers have produced a form of spectacle frame using modern injection moldable plastic materials. In most designs it has been found desirable to use metallic hinges to connect the temple bars to the spectacle frame. Designs wherein a non-metallic hinge is used have, in general, made use of one or more loose parts necessitating a more or less complicated assembly operation.

SUMMARY OF THE INVENTION

A spectacle hinge includes two parallel bosses formed on the spectacle frame, each defining a socket. A temple body has formed on the hinge end two hinge pin bars, each hinge pin bar having a hinge pin molded thereon. The two hinge pin bars are separated by a slot permitting assembly of the hinge. A pin arm locking bar is formed as a part of the temple body and is attached thereto by a web thin enough to be flexible. Cooperative locking means are formed on the locking bar and the pin arms. When the pins are located in the sockets in the bosses on the frame and the pin arm locking bar is positioned between the pin arms, a simple permanent hinge is formed. Hinge angle limiting means can be formed either on the temple bar or the frame.

From this description it is seen that the hinge of the invention comprises only the temple body and the spectacle frame. There are no loose parts required in assembly. The assembly operation comprises locating the two hinge pins in their respective openings in the frame and then snapping the pin arm locking bar into place. This assembly is easily and rapidly performed without the need for tools or fixtures. Thus, the hinge of the invention provides the spectacle buyer, i.e. the general public with an improved spectacle at the lowest possible cost.

A second feature of the hinge of the invention is that unlike a hinge having a continuous hinge pin, when an extraordinary shock is received by the hinge — instead of breaking, the hinge can be so proportional that the hinge will dislocate without damage. After dislocation, the hinge may then be reassembled. In the case of plastic hinges with metal pins, an extraordinary shock almost always results in irreparable damage to the hinge and hence abandonment of the spectacles at a high cost to the user. Because of the simplicity of the hinge assembly operation, it can be performed in the field by unskilled sales personnel. This enables the seller to provide a custom service to his clientelle, i.e., choice of temple body length to suit the individual. It also allows the seller to offer the customer a choice in the decorative effects of the spectacle — temple body combination.

DESCRIPTION OF THE PREFERRED EMBODIMENTS

Figure 1:
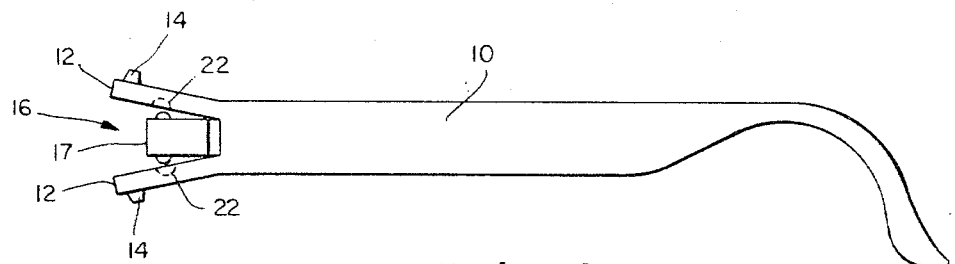
FIG. 1 depicts in elevation a temple bar end embodying the teaching of the invention.
Figure 2:
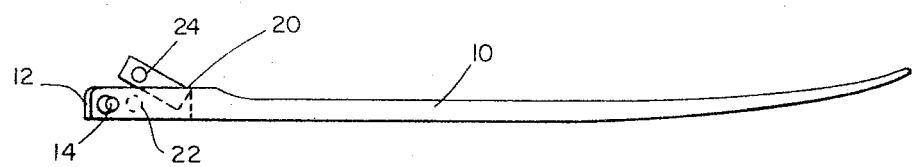
FIG. 2 depicts the part of FIG. 1 in plane.

In FIGS. 1 and 2 a spectacle temple body 10 is shown having two pin arms 12 integrally molded thereon. Hinge pins 14 form a part of each pin arm 12. The two pin arms 12 are separated by a slot 16. The width of this slot is no less than the height of both pins 14 taken together. A pin arm locking bar 17 having a width about equal to the width of the slot is also molded as an integral part of the temple body 10. The point of attachment 20 of the locking bar to the temple is a thin hinge web. This is sufficiently thin to be flexible so that the locking bar may be positioned directly between the two pin arms. A locking means is provided to lock the pin arm locking bar in place between the two pin arms. In FIGS. 1 and 2 the locking means comprises depressed areas 22 formed in the pin arms and complimentary raised areas 24 formed on the facing sides of the locking bar. Other locking means such as rectangular projections, ramps, sawtooth projections, etc. would be equally suitable.

Figure 3:
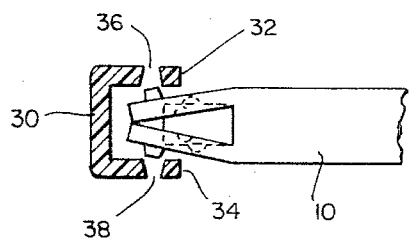
FIG. 3 depicts a cut away view of a portion of a spectacle frame and the temple bar end of FIG. 1 during a first step of the assembly operation.

In FIG. 3, a portion 30 of the spectacle frame is shown in section. Two bosses 32, 34 project in a perpendicular direction from the frame 30 to form the hinge. Each boss defines a socket or a hole. The socket 36 formed in boss 32 faces boss 34, the socket 38 formed in boss 34 faces boss 32, and the two sockets 36 and 38 are co-axial. In FIG. 3, the two pin arms 12 are shown sprung together enabling the two pins 14 to pass within the slot between the bosses 32 and 34.

Figure 4:
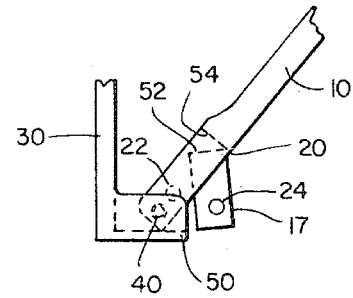
FIG. 4 depicts the same hinge a second step of the assembly.
Figure 5:
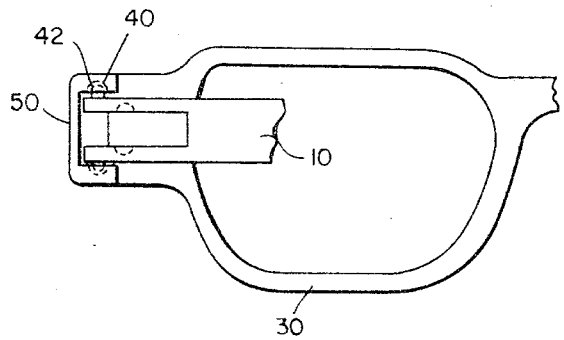
FIG. 5 depicts the hinge fully assembled.
Figure 6:
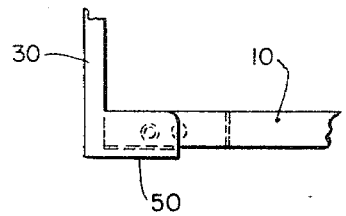
FIG. 6 depicts the hinge of FIG. 4 in plan.

In FIG. 4, the hinge is shown in plan partially assembled with the pins 14 located in sockets 36, 38. In FIG. 5 and 6, the hinge is shown in elevation and plan in the fully assembled state with the pin arm locking bar forced into its final position.

It is to be noted that the material from which the temple body 10 is made must have a somewhat elastic property. Fortunately, there are many presently available materials which have such elasticity among which can be named natural and artificial rubber and silicon compounds, polyvinyl chloride, polymides (nylon) and polyolefin such as polyethylene and polypropylene.

It will be noted that the sockets 36, 38 may extend completely through the webs 32, 34 as shown in FIG. 3 or they may go partially through as indicated at 40 in FIGS. 4, 5 and 6. Likewise, the pins 14 may be cylindrical as in FIG. 1 or may be mere rounded bumps as shown at 42 in FIG. 5. In the former design, the hinge will be solid. In the latter design (FIGS. 4, 5 and 6), the hinge will have the property of dislocating without permanent damage, due to the inherent flexibility of the pin arms. After dislocation, it is apparent that the hinge can be re-assembled as described above. The dislocation feature can serve to protect the hinge against permanent damage from excessive abuse.

The hinge 20 web may be located either at the extreme inside edge of the temple bar (as shown in FIG. 2), the extreme outside edge (as shown in FIG. 4) or in between. When the hinge web is located on the outside, it is convenient to mold the pin arm locking bar so that it extends outward from the temple body FIG. 4 (as defined by the location of the temple body in the spectacle assembly). When the hinge web is located on the inside, the pin arm locking bar will normally be molded to extend inward from the temple body (FIG. 2).

In a second embodiment of the invention shown in FIG. 4, 5 and 6, a web 50 is formed between the two hinge bosses 32 and 34 at the outer edges thereof. This serves to restrict the angular motion of the temples and providing a grip on the head of the wearer. It also serves to strengthen the bosses. Further, when the hinge pin locking bar is molded in the outward position as shown in FIG. 4, it is locked against outward movement by the web 50 (when the spectacles are open). Also by proper shaping of the heel 52 of the locking bar and the adjacent end 54 of the slot 16, the locking bar is locked against inward movement. It will be seen, however, that the hinge can readily be assembled with the temples in a folded position.

It is often desirable to provide some "friction" in a spectacle hinge. In the present invention, this may easily be accomplished by forming the two pin arms in a somewhat flared position as shown in FIG. 1. However, friction may also be provided by proper fit of the two spectacle parts.

It will also be seen from this description that the hinge is completely formed by the spectacle frame and the temple body. There are no loose bits and pieces to be handled during assembly and subject to loss. The assembly operation is extremely easy and requires no tools. Therefore, assembly may be carried out by untrained personnel. This permits the seller to carry a stock of temples of various lengths, frames of various widths and decorative combinations of frames and temples. Thus, the purchaser has a wide choice of spectacle suited to both his physical size and his tastes with the minimum of inventory on the part of the seller.

Although the description of the hinge of the invention has been limited to one form of spectacle hinge, it will be apparent to one skilled in the art that the locations of the several parts of the hinge can be transposed between frame and temple body within the compass of the invention. It is further apparent that the hinge of the invention is suitable for uses other than spectacles as for instance, molded plastic boxes of all sorts. Further, it will be apparent that only the part of hinge shown in the description as the temple body need be molded of a flexible material. The remainder of the hinge may be equally well made of a comparatively non-elastic material such as a stiff plastic or a metal. Among the stiff plastics can be listed styrene, methacrylate, urea formaldehyde, bakelites, etc.

Having fully described my invention, I hereby claim:

1. A readily assembled hinge formed between a first hinge member and a second molded plastic hinge member which comprises:
   a. a first boss and second boss, each boss extending from a surface of the first hinge member, a first socket formed in the first boss and a second socket formed in the second boss, the second socket being coaxial with and located opposite to the first socket;
   b. a first pin arm and a second pin arm forming a part of the second molded plastic hinge member, the first pin arm and the second pin arm defining a slot therebetween, the first pin arm including a first pin means projecting therefrom, the second pin arm including a second pin means projecting therefrom, the first pin means being located in the first socket and the second pin means being located in the second socket;
   c. a pin arm locking bar integrally formed as a part of the second molded plastic hinge member, the pin arm locking bar being located within the slot defined by the pin arms and being attached to the second molded plastic hinge member by a flexible web; and,
   d. cooperative locking means locking the pin arm locking bar between the first and the second pin arms.

2. A readily assembled hinge formed between a first hinge member and a second molded plastic hinge member as defined in claim 1 wherein the cooperative locking means includes first means formed on the pin arms and second means formed on the pin arm locking bar.

3. In a spectacle comprising a frame and at least one temple piece wherein the frame includes at least one frame hinge portion and the temple piece includes a molded plastic hinge end, the improvement which comprises:
   a. the hinge portion of the frame comprising a first hinge boss and a second hinge boss the first hinge boss having a first socket formed therein and the second hinge boss having a second socket formed therein, the second socket being coaxial with and located opposite to the first socket;
   b. the hinge end of the temple piece comprising a first pin arm, and a second pin arm, the first pin arm and the second pin arm defining a slot therebetween, the first pin arm including a first pin means projecting therefrom and extending into the first socket, the second pin arm including a second pin means projecting therefrom and extending into the second socket;
   c. a pin arm locking bar forming a part of the temple piece, the pin arm locking bar being located within the slot defined by the first pin arm and the second pin arm and being attached to the temple piece by a flexible web; and
   d. cooperative locking means formed on the first pin arm, the second pin arm and the pin arm locking bar.

4. A spectacle as defined in claim 3 wherein a web connects the first boss and the second boss; the web serving to restrict the angular motion of the temple piece with respect to the frame.

5. A spectacle as defined in claim 3 wherein the pin arms are formed in a flared position with respect to the first and second hinge bosses, such that when the first and second pin means are located within their respective sockets there is frictional engagement between contacting surfaces of the pin arms and the first and second hinge bosses.

6. A spectacle as defined in claim 3 wherein the cooperative locking means includes first locking means formed on the pin arms and second locking means formed on the pin arm locking bar.

7. A spectacle as defined in claim 6 wherein the first locking means formed on the pin arms comprises protuberances thereon and the second locking means comprises depressions formed on the pin arm locking bar.

8. A spectacle which comprises:

a. a frame including a hinge portion, the hinge portion comprising a first hinge boss extending in an approximate perpendicular direction from the surface of the frame, a second hinge boss approximately parallel to the first hinge boss, the first boss having a socket facing the second boss, the second boss having a socket coaxial with and facing the first boss;

b. a temple piece including a hinge end, the hinge end comprising a first pin arm and a second pin arm, the first pin arm and the second pin arm defining a slot therebetween, the first pin arm including hinge pin means extending outwardly therefrom and engaged in the socket in the first hinge boss, the second pin arm including hinge pin means extending outwardly therefrom and engaged in the socket in the second hinge boss;

c. a pin arm locking bar forming a part of the temple piece, the pin arm locking bar being located within the slot defined by the first pin arm and the second pin arm, and being attached to the temple by a web of the material from which the temple bar and the pin arm locking bar is made, the web being thin enough to be flexible; and d. cooperative locking means locking the pin arm locking bar between the pin arms, the locking means comprising interlocking protuberances formed on the pin arms and depressions formed on the pin arm locking bar.

* * * * *